Aug. 26, 1941.  J. F. JOY  2,253,626
KERF-CUTTING MACHINE
Filed Oct. 12, 1938  8 Sheets-Sheet 1
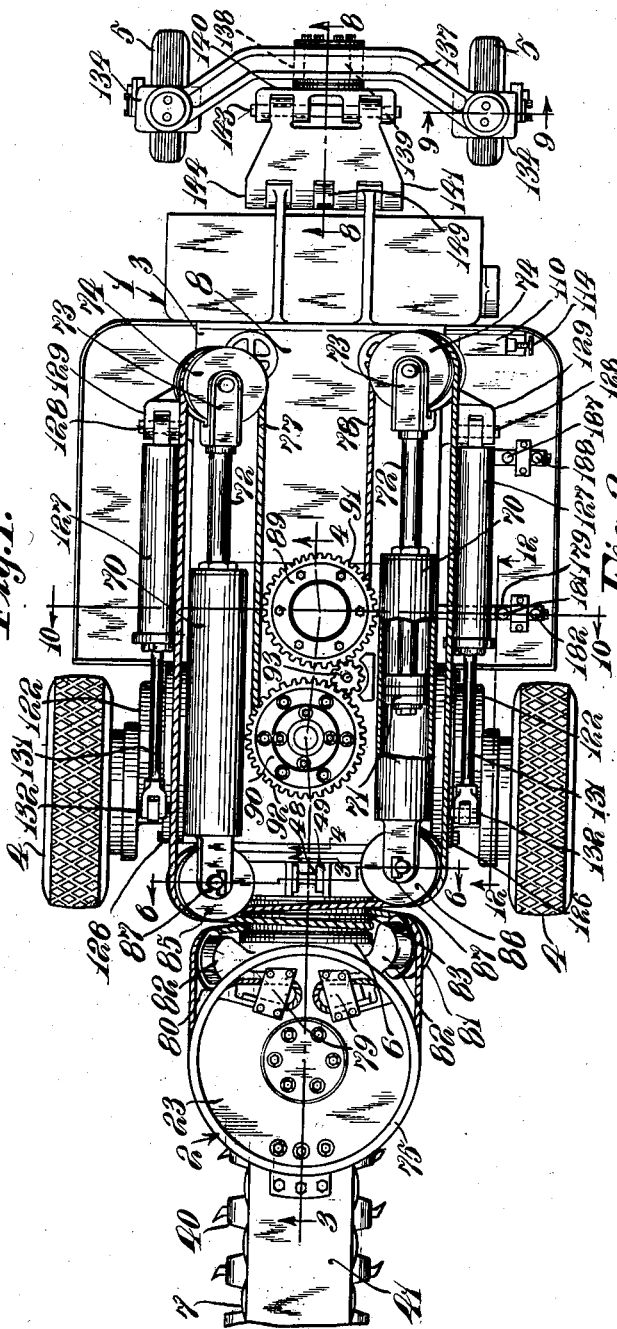
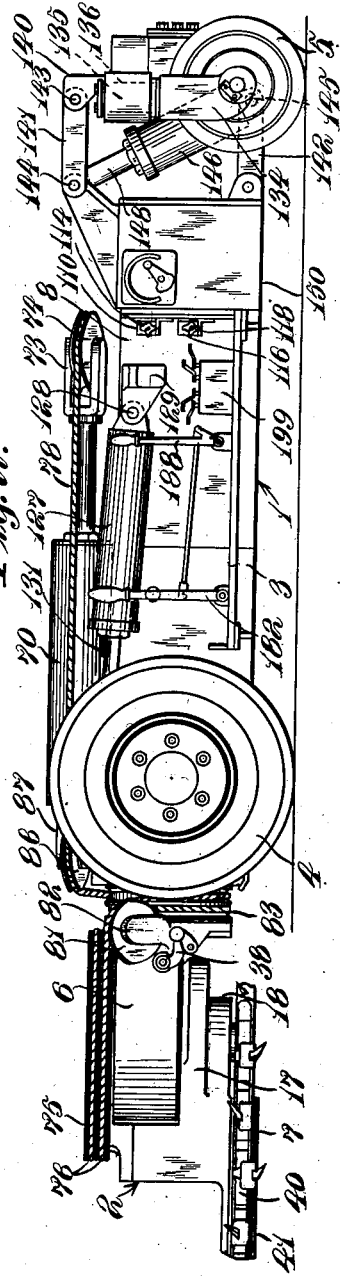
Inventor:
Joseph F. Joy.
by Louis A. Maxson
Att'y.

Aug. 26, 1941.    J. F. JOY    2,253,626
KERF-CUTTING MACHINE
Filed Oct. 12, 1938    8 Sheets-Sheet 2

Inventor:
Joseph F. Joy,
by
Atty.

Aug. 26, 1941.                    J. F. JOY                    2,253,626
                            KERF-CUTTING MACHINE
                            Filed Oct. 12, 1938              8 Sheets-Sheet 3
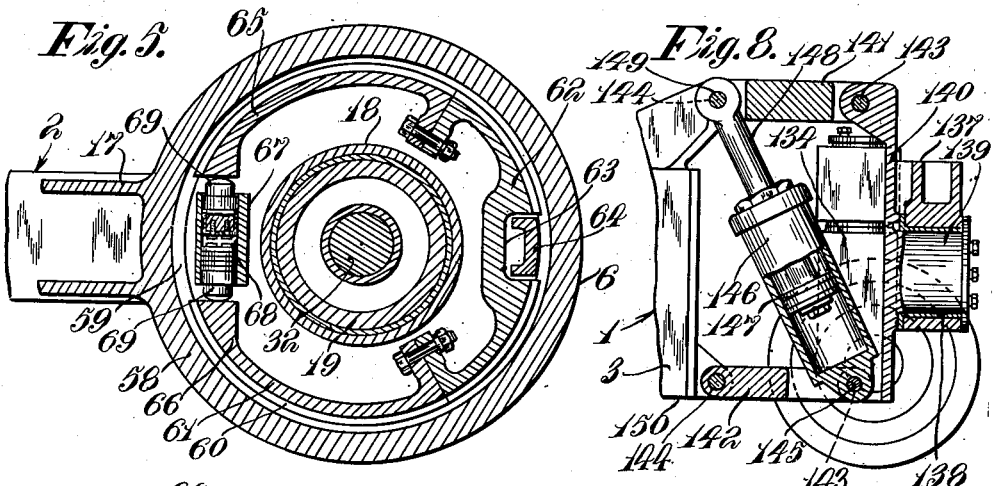
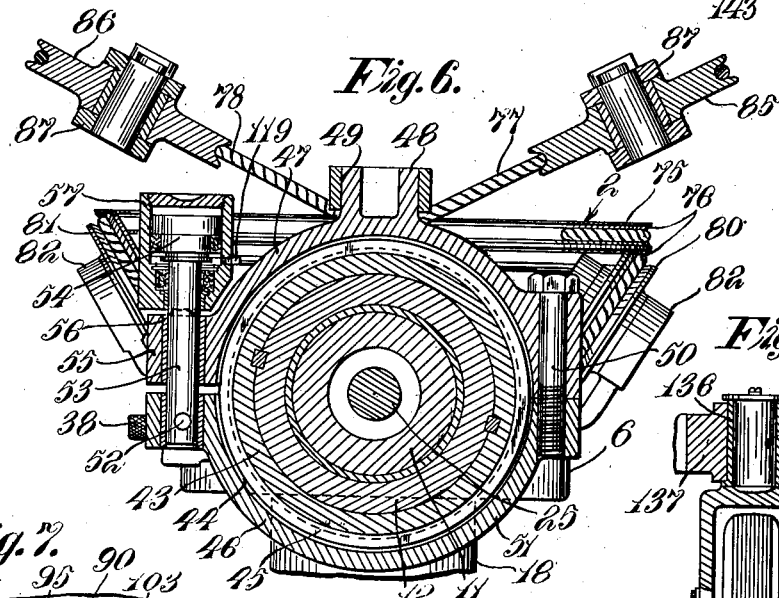
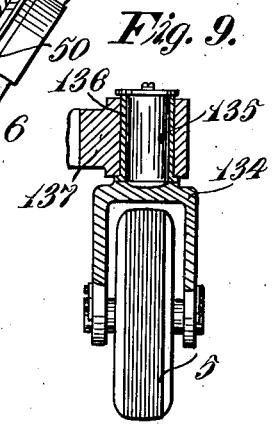
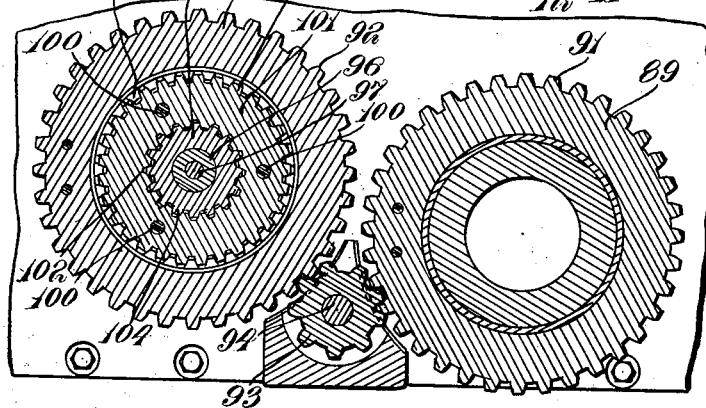
Inventor:
Joseph F. Joy.
by Louis A. Maxson.
Atty.

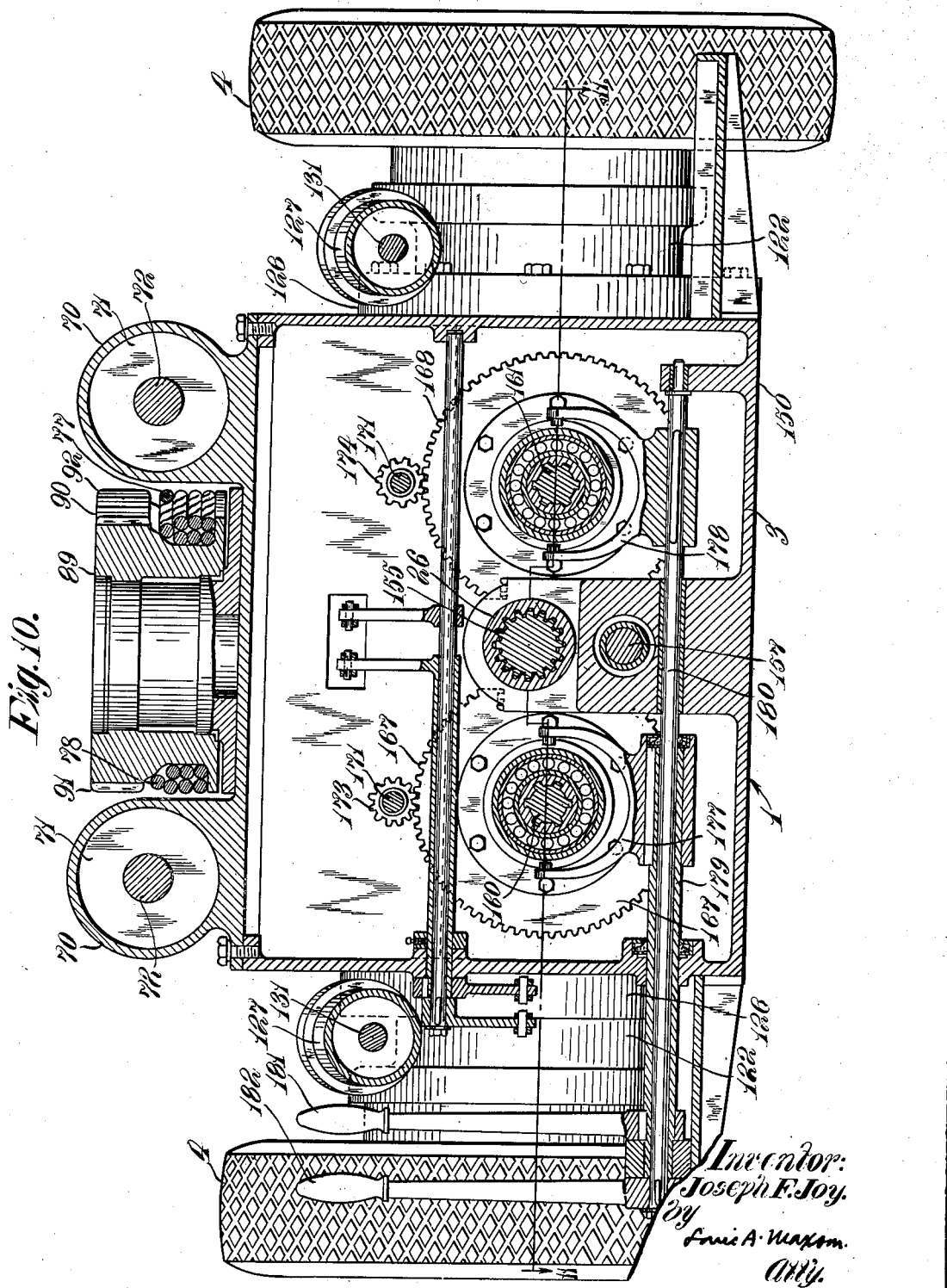

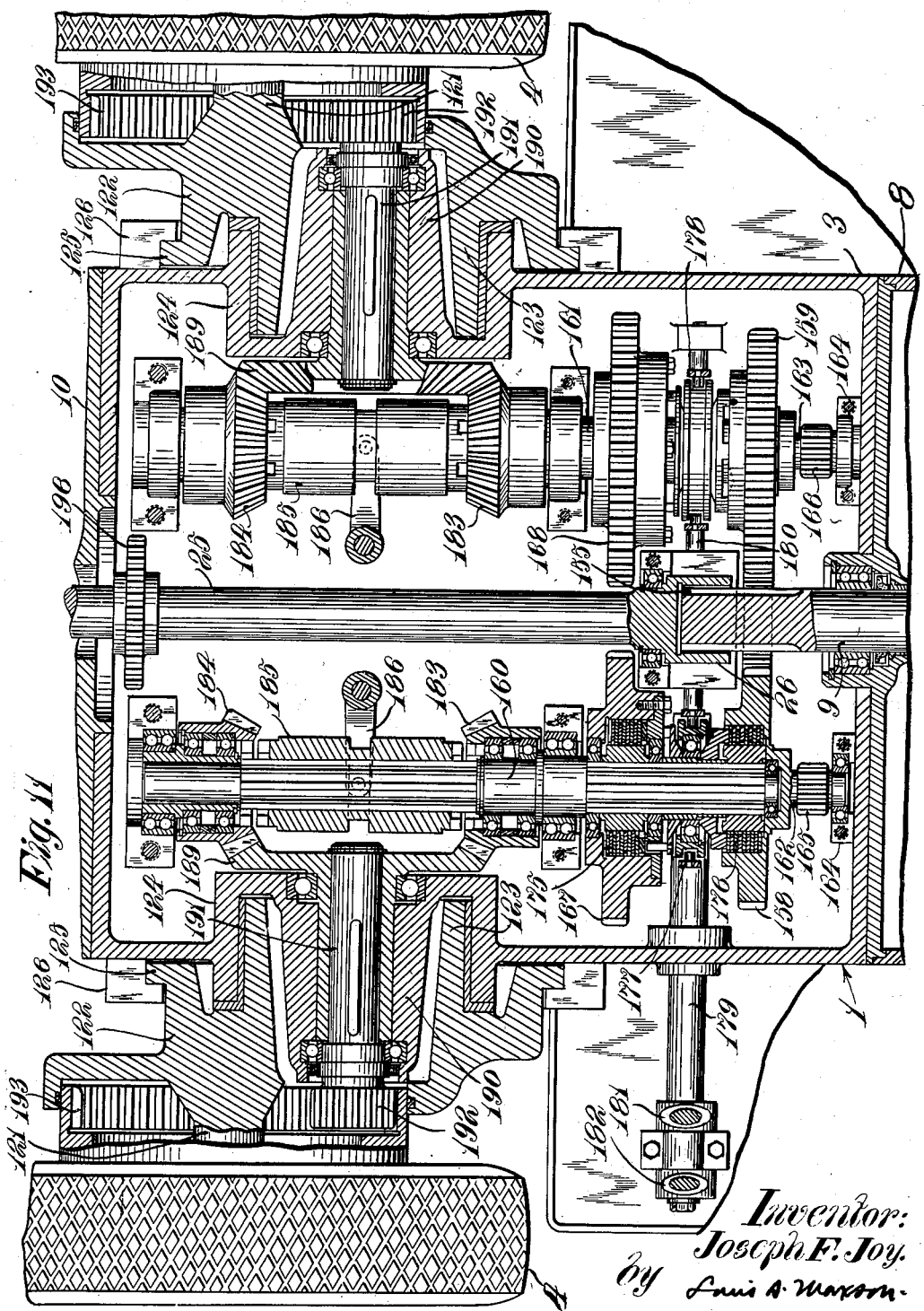

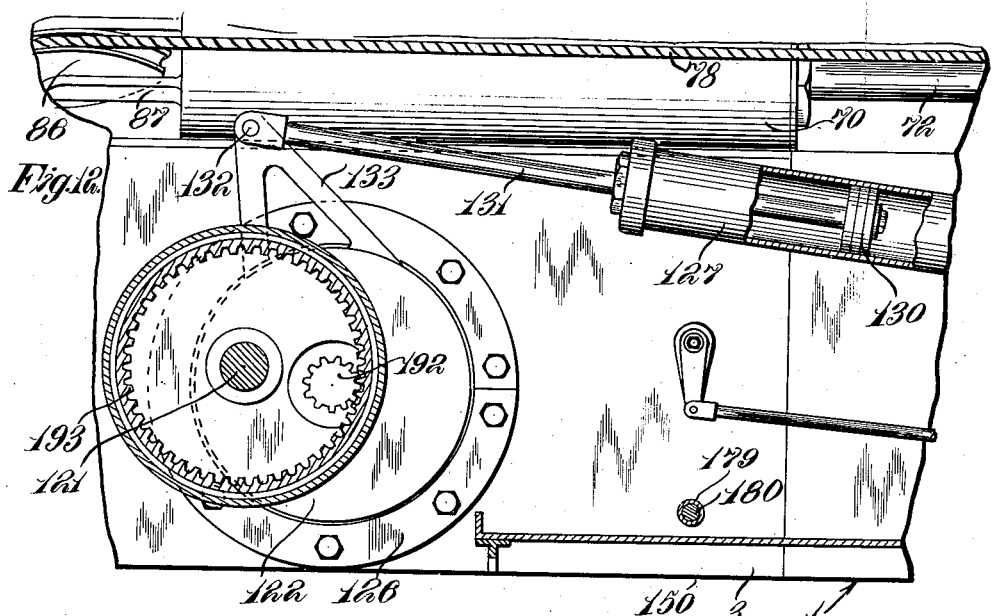
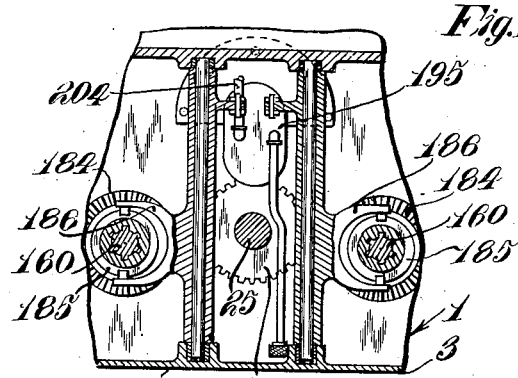
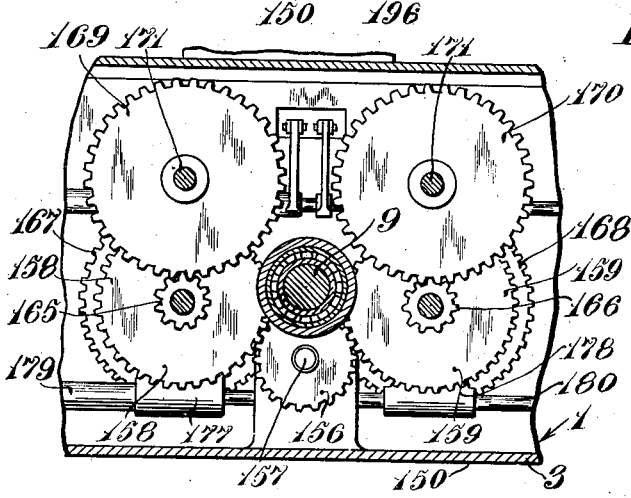

Inventor:
Joseph F. Joy.

Inventor:
Joseph F. Joy.

Patented Aug. 26, 1941

2,253,626

UNITED STATES PATENT OFFICE 2,253,626

KERF-CUTTING MACHINE

Joseph F. Joy, Pittsburgh, Pa., assignor to Sullivan Machinery Company, a corporation of Massachusetts Application October 12, 1938, Serial No. 234,522

18 Claims. (Cl. 262—28)

This invention relates to kerf-cutting machines, and more particularly, but not exclusively, relates to a kerf-cutting machine of the wheel-mounted, rubber-tired type especially designed for use in trackless coal mines.

An object of the present invention is to provide an improved kerf-cutting machine especially designed for use in trackless coal mines. Another object is to provide an improved kerf-cutting machine of the wheel-mounted, rubber-tired type wherein certain of the wheels thereof are employed for propelling the machine not only during transport about the mine but also during the cutting operation. A further object is to provide an improved kerf-cutting machine of the combined horizontal and shear cutter type having an improved adjustable kerf-cutting mechanism whereby kerfs may be cut at various locations in the coal face. Still another object is to provide an improved mechanism for adjusting the kerf cutter into different horizontal cutting planes with respect to the mine floor, and embodying improved means for tilting the kerf cutter with respect to the horizontal. A still further object is to provide an improved wheel-mounting structure for a kerf-cutting machine. Still another object is to provide an improved wheel-mounting structure wherein pneumatic rubber-tired wheels are engageable directly with the mine floor for supporting and propelling the machine, thereby eliminating the necessity of a mine trackway. A still further object is to provide an improved kerf-cutting machine of an extremely compact character and which is also relatively simple and rugged in construction and may be readily operated and controlled. Other objects and advantages will hereinafter more fully appear, in the course of the following description and as more particularly pointed out in the appended claims.

In the accompanying drawings there is shown, for purposes of illustration, one form which the invention may assume in practice.

In these drawings—

Fig. 1 is a top plan view of an illustrative embodiment of the improved kerf-cutting machine.

Fig. 2 is a side elevational view of the kerf-cutting machine shown in Fig. 1.

Fig. 5 is a horizontal sectional view taken substantially on line 5—5 of Fig. 3, with parts omitted.

Fig. 6 is an enlarged, cross sectional view taken substantially on line 6—6 of Fig. 1.

Fig. 7 is a horizontal sectional view taken substantially on line 7—7 of Fig. 4.

Fig. 8 is an enlarged, longitudinally extending, vertical sectional view taken substantially on line 8—8 of Fig. 1.

Fig. 9 is an enlarged, detail vertical sectional view taken on line 9—9 of Fig. 1.

Fig. 10 is a cross sectional view taken substantially on line 10—10 of Figs. 1 and 4.

Fig. 11 is a horizontal sectional view taken substantially on line 11—11 of Fig. 10.

Fig. 12 is an enlarged view in longitudinal vertical section taken substantially on line 12—12 of Fig. 1.

Fig. 13 is a cross sectional view taken on line 13—13 of Fig. 4.

Fig. 14 is a cross sectional view taken on line 14—14 of Fig. 4.

Figure 3:
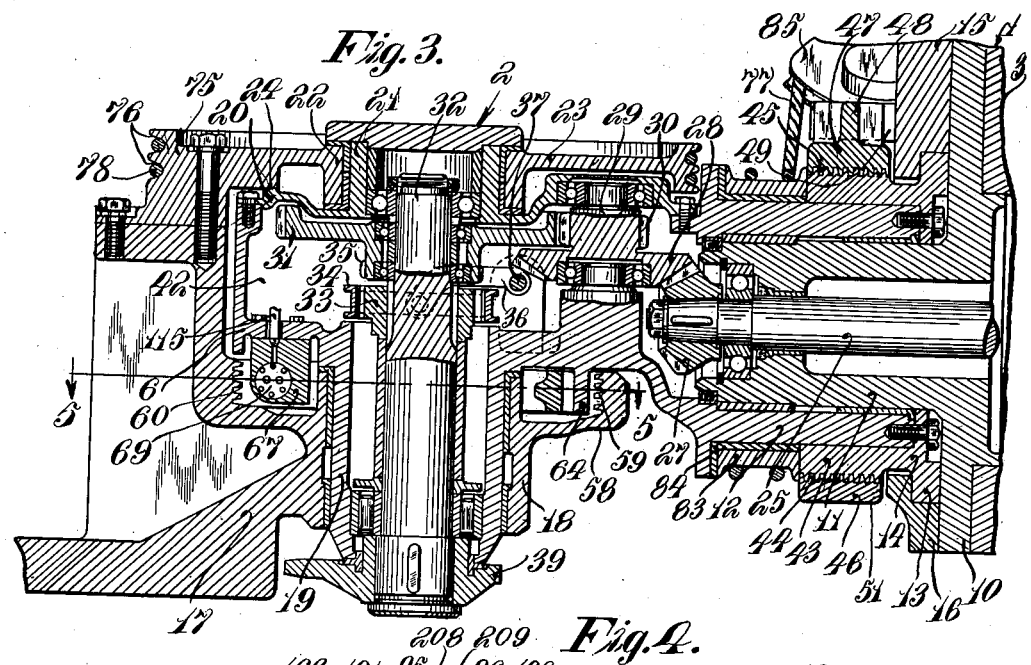
Fig. 3 is an enlarged, longitudinally extending, vertical sectional view taken substantially on line 3—3 of Fig. 1.

In this illustrative embodiment of the invention there is shown a kerf-cutting machine of the combined horizontal and shear cutter type, herein mounted on wheels having pneumatic rubber tires adapted to run directly on the mine floor, and especially designed for use in trackless coal mines, the rubber-tired wheels not only supporting the machine for movement about the mine during transport, but also providing traction means for propelling the machine during the cutting operation. It will be evident, however, that various features of the invention may be embodied in kerf-cutting machines of various other types, and that the machine, in certain embodiments, may be crawler-tread mounted or mounted on track wheels for movement along a mine trackway.

As shown in the drawings, the improved kerf-cutting machine generally comprises a low, compact portable base 1 having mounted thereon kerf-cutting mechanism generally designated 2. The base 1 is herein in the form of a horizontal frame 3 mounted in a relatively low position on front traction wheels 4 and rear guide wheels 5, these front and rear wheels having pneumatic rubber tires engageable directly with the mine floor over which the machine is adapted to travel. The kerf-cutting mechanism includes a revoluble cutter head 6 mounted on the front end of the machine frame 3 for rotation about an axis extending longitudinally of the frame and having pivotally mounted thereon to swing relative thereto about an axis at right angles to the head axis, an elongated plane kerf cutter 7. Supported by the machine frame 3 is a motor 8, herein preferably of the reversible electric type, having its power shaft 9 extending longitudinally of the frame, with its axis of rotation in coincidence with the cutter head axis. This motor is adapted to drive the various elements of the machine through improved connections as hereinafter described.

Referring to the kerf-cutting mechanism 2, it will be noted that secured to the front end of the machine frame 3 is a detachable end plate or cover 10 having a cylindric portion 11 projecting forwardly therefrom, and the frame of the cutter head 6 has a cylindric sleeve-like bearing portion 12 journaled on bearing sleeves supported by the portion 11, in the manner shown in Fig. 3. The cutter head 6 is retained in position on its bearing mounting by an annular external flange 13 formed integral with an annular member 14 secured, as by screws, to the cutter head frame portion 12, and this flange engages within arcuate guides formed by, and cooperates with, upper and lower gibs 15 and 16 suitably detachably secured to the end plate 10. Swivelly mounted on the cutter head frame on an axis coincident with the kerf-cutter-pivot axis is a cutter support 17 by which the kerf cutter 7 is carried, and this cutter support has a cylindric portion 18 journaled on bearing sleeves supported by a cylindric bearing support 19 integral with the cutter head frame. Secured, as by screws, to the cutter head frame is a detachable cover plate 20 having a cylindric projection 21 alined with the cylindric portion 19 and supporting bearing sleeves on which is journaled a sleeve-like bearing portion 22 of a circular member 23, the latter being detachably secured, as by screws, to the swiveled cutter support 17. This circular member 23 engages at 24 an outer arcuate plane bearing surface of the cutter head frame, herein formed on the cover plate 20, for retaining the cutter support in position on its bearing mounting on the cutter head frame. It will thus be seen that the kerf cutter 7 may be swung in its plane about an axis at right angles to the cutter head axis, and that the cutter head axis is disposed longitudinally of the machine frame 3, thereby to enable adjustment of the kerf cutter into horizontal, vertical, or any desired intermediate cutting planes.

Figure 4:
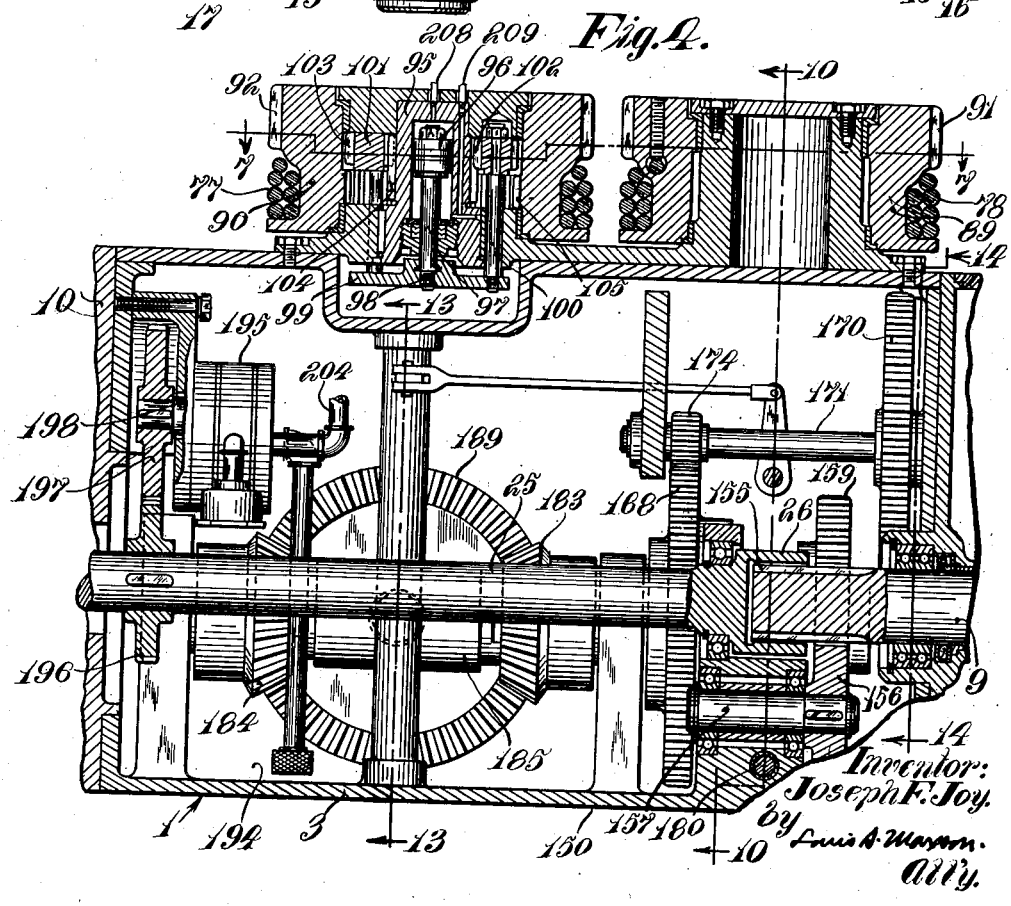
Fig. 4 is an enlarged, longitudinally extending, vertical sectional view taken substantially on line 4—4 of Fig. 1.

The driving means for the kerf cutter comprises a shaft 25 suitably journaled within and extending longitudinally of the machine frame 3 and connected by a conventional coupling 26 to the forward end of the motor power shaft 9, as shown in Fig. 4. The shaft 25 is arranged with its axis of rotation in coincidence with the axis of cutter head rotation and extends forwardly centrally through the cylindric bearing portion 11 and is journaled at its forward end within a bearing supported within the portion 11. Keyed to the forward end of the shaft 25 is a bevel motor pinion 27, herein meshing with a bevel gear 28 formed integral with a right-angle shaft 29 suitably journaled within the cutter head frame, and formed on and driven by the shaft 29 is a spur gear 30 meshing with a large spur gear 31. The hub of the gear 31 is journaled on ball bearings supported by a shaft 32, herein arranged with its axis coincident with the swivel axis of the cutter support 17. This shaft 32 has fixed thereto a toothed clutch member 33 connectible by a sliding toothed clutch member 34 to clutch teeth 35 formed on the hub of the gear 31; and when the clutch member 34 is slid upwardly interlockingly to engage the clutch teeth 35, the shaft 32 is connected to the gear 31 for driving by the latter. The operating means for the clutch member 34 comprises a shipper yoke 36 (Fig. 3) fixed to a transverse operating shaft 37; and secured to the shaft, exteriorly of the cutter head frame, is an operating handle 38 (Fig. 2). The shaft 32 is suitably journaled in ball and roller bearings supported within the cutter head frame and has keyed thereto a chain sprocket 39 which engages and drives an endless cutter chain 40 guided for circulation about the margin of a cutter bar 41 of the kerf cutter 7. It will thus be seen that when the clutch 33, 34, 35 is connected the cutter chain 40 may be driven from the motor 8 through the bevel gearing 27, 28, spur gears 30, 31, shaft 32 and the chain sprocket 39; and when the clutch is disconnected, the cutter chain may remain idle during running of the motor. The bevel gearing, the spur gearing, the cooperating clutch parts, and the gear and shaft bearings are all enclosed within a chamber 42 formed within the cutter head frame, and this chamber is adapted to contain a lubricant bath for the various moving parts.

Locking means is provided for locking the revoluble cutter head 6 and swiveled cutter support 17 against pivotal movement about their respective axes. The cutter head lock comprises a brake drum 43, herein formed integral with the annular member 14 secured to the cutter head frame, and this brake drum has a series of external tooth-like annuli 44 cooperating with similar internal tooth-like annuli 45 formed on a contractible brake band 46. This brake band comprises an upper segment 47 having a rectangular projection 48 fitting within a slot 49 formed in a portion of the upper gib 15, and this projection 48 prevents rotation of the brake band with the brake drum. Secured, as by a screw 50, to the upper band segment 47 is a lower band segment 51, and the latter has its free end pivotally connected at 52 to a piston rod 53 of a fluid-actuated piston 54, as shown in Fig. 6. The upper band segment 47 has its end portion 55 bored to receive a sleeve 56 which provides a guide for the piston rod 53. The piston 54 is contained within a vertical cylinder 57 having at its inner side rocking engagement with the end portion 55 of the band segment 47. From the foregoing, it will be evident that when fluid under pressure is supplied to the lower end of the cylinder 57 the lower segment of the brake band is drawn upwardly toward the upper segment, thereby frictionally to lock the brake drum against rotation and, as a result, to lock the revoluble cutter head 6 against rotation about its axis. The lock for the swiveled cutter support 17 comprises a brake drum 58 (Fig. 5) formed integral with the swiveled cutter support 17, and this brake drum has a series of internal tooth-like annuli 59 with which cooperate similar external tooth-like annuli 60 (see also Fig. 3) formed on an expansible brake band 61. This brake band comprises a central band segment 62 having a recess 63 within which projects a lug 64 formed integral with the cutter head frame, and this lug acts as a stop for holding the brake band against rotation. Attached to the central band segment 62 are end band segments 65 and 66. Secured to the cutter head frame is a cylinder block 67 having a bore 68 containing oppositely acting pistons 69, 69, these pistons having piston rods abutting the free ends of the brake band. When fluid under pressure is supplied to the cylinder bore between the pistons, the latter are moved apart, thereby to effect expansion of the brake band; and as a result, the cutter support 17 is locked against pivotal movement with respect to the cutter head 6. The means for supplying hydraulic pressure to the cylinders to act on the pistons to effect application or for venting the cylinders to effect release of the brake bands will be later described.

The mechanism for rotating the cutter head 6 and swinging the cutter support 17 to move the kerf cutter selectively about rectangularly related axes, comprises a pair of horizontal hydraulic cylinders 70, 70 arranged in parallel side-by-side longitudinal relation within the top of the frame 3, as shown in Figs. 1, 2 and 10. These cylinders contain reciprocable pistons 71 (Fig. 1) having piston rods 72 extending rearwardly through the rear packed heads of the cylinders. The rear end of each of the piston rods carries a bracket 73 in which is journaled a sheave or pulley 74. The means for supplying fluid under pressure to these cylinders will be later described. As shown in Fig. 3, formed integral with the circular frame member 23 of the swiveled cutter support 17 is a cable drum 75 having cable guiding grooves 76 for guiding cables 77 and 78 about the drum. These cables are attached at one end at 79 (see Fig. 1) to the drum 75 and extend rearwardly from the grooves on the drum around laterally located guide sheaves 80 and 81, respectively, the latter being journaled in brackets 82 secured to the cutter head frame at the opposite sides of the head axis. The cables pass around the sheaves 80 and 81 and extend in opposite directions (Figs. 1 and 6) around the opposite sides of a cable guiding drum or pulley 83 loosely journaled on a bearing sleeve 84 surrounding and supported by the circular bearing portion 12 of the cutter head frame. The cables pass about the guiding drum 83 and extend in opposite directions upwardly from the opposite sides thereof and around guide sheaves 85 and 86 respectively, the latter being journaled on brackets 87 secured to the forward ends of the cylinders 70. The cables pass about these sheaves 85 and 86 and extend rearwardly therefrom along the outer sides of the hydraulic cylinders 70, in the manner shown in Figs. 1 and 2, and pass around the sheaves 74 carried by the piston rods of the pistons 71, the cables passing around these sheaves and then extending forwardly along the inner sides of the hydraulic cylinders 70. The opposite ends of these cables 77 and 78 are wound upon and suitably secured to horizontal drums 89 and 90 arranged on parallel vertical axes on the top of the machine frame 3 in the space between the hydraulic cylinders 70, as shown in Figs. 1 and 10, the cable 77 being wound on the drum 90 and the cable 78 on the drum 89. These drums are rotatable to vary the length of the cables, for a purpose to be later explained, and have formed integral therewith spur gears 91 and 92, respectively; and meshing with these gears is a gear 93 journaled on a vertical shaft 94 (see Fig. 7). It will thus be seen that the drums 89 and 90 are geared together for simultaneous rotation in the same direction, so that when one drum rotates to unwind its cable the other drum rotates to wind in its cable. A lock is provided for locking the drums 89, 90 against rotation and comprises, as shown in Fig. 4, a vertical cylinder 95 arranged coaxially within the drum 90 and secured to the frame 3. This cylinder contains a fluid-actuated piston 96 having its piston rod 97 extending downwardly through the packed lower head of the cylinder and threadedly connected at 98 to an operating disc 99. Secured by rods 100 to this disc is an annular lock member 101 having internal and external locking teeth 102 and 103, the internal teeth being slidingly interlocked with teeth 104 formed on the exterior of the stationary cylinder 95. Formed on the drum 90 are locking teeth 105, and when the lock member 101 is slid downwardly into interlocking engagement with the teeth 105, the drum is locked to the stationary frame, and, due to the geared connection between the drums, the drum 89 is locked in stationary relation therewith. The means for supplying fluid under pressure to the cylinder 95 will be later described. From the foregoing it will be evident that when the cutter head lock 44, 45, 46 is released and the swiveled cutter support 17 is locked to the revoluble cutter head 6 and fluid under pressure is supplied to the forward end of one of the cylinders 70, the piston 71 therein is moved rearwardly, thereby effecting tensioning of one of the cables 77, 78 while the tension on the other cable is relieved; and as a result, the cable acting on one of the laterally located sheaves 80, 81 effects rotation of the revoluble cutter head 6 in one direction about its pivot, the pull of the tensioned cable on the laterally located sheave effecting such rotation of the cutter head. When the cutter head lock is applied and the cutter support lock 58, 59 is released, the cutter support 17 may be swung about its pivot relative to the cutter head 6 whenever fluid under pressure is supplied to one of the cylinders 70 to effect tensioning of one of the cables 77, 78 and to relieve the tension on the other cable. During either cutter head rotation or cutter support swing, when the limit of rearward movement of one of the pistons 71 is reached, an increased range of movement may be attained by locking both the head and cutter support against movement about their respective axes and releasing the lock for the drums 89 and 90. When the drum lock is released and the retracted piston 71 is moved in a rearward direction within its cylinder, the cable on one of the drums 89, 90 is wound in while the other cable is paid out, thereby to effect retraction of the extended piston. When the previously extended piston 71 is in its retracted position, the drums 89, 90 are again locked against rotation, and when fluid under pressure is supplied to the forward end of the cylinder 70 of the then-retracted piston 71 and either the cutter head or cutter support lock is released, one of the cables is again tensioned while the tension on the other cable is relieved, and, as a result, cutter head rotation or cutter support swing may be resumed throughout the range of another stroke of the piston 71. It will thus be seen that by varying the length of the cables 77, 78, a range of cutter head rotation and cutter support swing, greater than the range of travel of the pistons 71, may be obtained, thereby eliminating the necessity of cylinders of extreme length.

Figure 16:
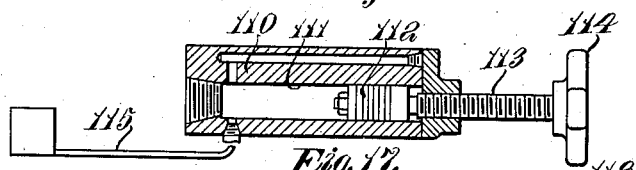
Fig. 16 is a somewhat diagrammatic view, with parts shown in section, illustrating the operating means for the kerf cutter lock.
Figure 17:
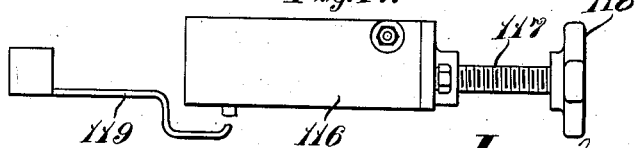
Fig. 17 is a somewhat diagrammatic view showing the operating means for the cutter head lock.

In Figs. 16 and 17 manually operable pumps are disclosed for supplying fluid under pressure to the operating means for the brakes of the revoluble cutter head 6 and swiveled cutter support 17. Mounted transversely at the rearward end of the frame 3 is a cylinder block 110 having a horizontal bore 111 containing a piston 112. This piston may be moved axially within the cylinder bore by a screw 113 threaded within the outer cylinder head and having an operating handle 114. This cylinder bore is connected through a conduit 115 to the bore 68 of the cylinder 67 (see Fig. 5) between the pistons 69, 69 so that when the piston 112 is moved inwardly by the screw, fluid under pressure is forced from the cylinder bore through the conduit 115 to the bore of the cylinder 67 to force apart the pistons 69, 69, thereby to effect application of the cutter support brake. Mounted on the rearward end of the frame 3, immediately below the cylinder block 110, is a similar cylinder block 116 having a similar horizontal bore containing a piston movable axially within the cylinder bore by an adjusting screw 117, the latter having a similar operating handle 118. The bore of the cylinder block 116 is connected through a conduit 119 to the lower end of the bore of the cylinder 57, so that when the piston of the cylinder block 116 is moved inwardly by the screw, fluid under pressure is forced from the cylinder block bore through the conduit 119 to the bore of the cylinder 57 beneath the piston 54 to move the latter upwardly, thereby to effect application of the cutter head brake. When the pistons within the cylinder blocks 110 and 116 are permitted to move outwardly within their respective bores, the pistons are relieved of the pressure of the fluid, thereby to effect release of the brakes, in an obvious manner.

Now referring to the improved wheel mounting structure of the machine, it will be noted that the front rubber-tired traction wheels 4 are journaled in a conventional manner on stub axles 121 each formed integral with a swiveled axle frame 122. These axle frames are arranged at the opposite sides of the forward portion of the frame 3 in the manner shown in Fig. 1 and each has a cylindric bearing portion 123 journaled in a bearing sleeve supported within a cylindric bearing portion 124 formed integral with the frame 3. The stub axles are arranged with their axes eccentrically disposed with respect to the axes of rotation of the axle frames 122, so that when the axle frames are revolved within their bearings with respect to the machine frame, the stub axles 121 are moved in an arcuate path about the alined swivel axes of the axle frames. Therefore, when the wheels are in engagement with the mine floor and the axle frames are rotated in one direction or the other, the forward end of the frame 3 of the machine, together with the kerf-cutting mechanism carried thereby, is either elevated or lowered. The swiveled axle frames 122 have external annular flanges 125 received in arcuate guideways formed in guide members 126 secured to the sides of the frame 3; and these cooperating guide members and annular flanges serve to retain the swiveled axle frames in their bearing mountings. The means for effecting swiveling movement of the axle frames 122 comprises a pair of hydraulic cylinders 127, 127 extending longitudinally along the opposite sides of the frame 3 in the manner shown in Fig. 1 and pivotally mounted on the sides of the frame 3 at 128 on bearing brackets 129. These cylinders 127 contain reciprocable pistons 130 (Fig. 12) having their piston rods 131 extending forwardly through the front packed heads of the cylinders and pivotally connected at 132, at their forward ends, to lateral arms 133 formed integral with the axle frames 122. It will thus be seen that when fluid under pressure is supplied to one end or the other of the cylinders 127, the pistons contained therein may be moved to effect rotative movement of the axial frames 122 within their bearing mountings, thereby to either raise or lower the forward end of the machine frame 3. By trapping the liquid within the cylinders 127, the axle frames may be locked against rotation relative to the frame 3, thereby to hold the frame 3 in any of its elevated positions.

As illustrated, the rear rubber-tired guide wheels 5 are carried by swiveled caster frames 134 having integral vertical shaft portions 135 (Fig. 9) respectively journaled at 136 within the ends of a pivoted axle or equalizer bar 137. This equalizer bar extends transversely at the rear end of the machine and is journaled at 138, midway between its ends, on a longitudinal pivot portion 139 (see Fig. 8) located at the longitudinal vertical center of the frame 3 and formed integral with a vertical connecting frame 140. The connecting frame 140 is connected by parallel upper and lower arms 141, 142 (Fig. 8) to the rear end of the machine frame 3, these arms being pivotally connected at 143 to the connecting frame 140 and at 144 to the machine frame 3. Pivotally mounted at 145, on an axis coincident with the axis of pivotal connection of the lower arm 142 with the vertical connecting frame 140, is a vertically swingable hydraulic cylinder 146. This cylinder contains a reciprocable piston 147 having its piston rod 148 extending upwardly through the packed upper head of the cylinder and pivotally connected at its upper end at 149, on an axis coincident with the pivotal axis of the connection of the upper link 141 with the frame 3, to the frame 3. It will thus be seen that when hydraulic pressure is supplied to one end of the cylinder 146 at one side of the piston 147, the rearward portion of the machine frame 3 may be swung either upwardly or downwardly relative to the connecting frame 140 while, due to the parallel arms 141, 142, the pivot portion 139 for the equalizer bar always remains horizontal. By trapping the liquid within the cylinder 146 the machine frame 3 may be locked in its elevated position with respect to the connecting frame 140. The frame 3 of the machine is provided with a plane bottom surface 150 adapted to rest directly on the mine floor when the cylinders 127 and 146 are operated to lower the frame into engagement with the mine floor; and when the frame is resting on its bottom on the mine floor the cylinders 127 and 146 may be operated to raise the wheels 4 and 5 out of engagement with the mine floor, so that at that time the machine is resting directly on the mine floor wholly independently of the wheels. The provision of the pivoted equalizer bar and swiveled caster wheel arrangement facilitates steering of the machine and permits movement of the machine over an uneven floor, and by the provision of adjustable wheel mountings whereby the machine may at times rest directly on the floor, increased stability is obtained during certain of the kerf-cutting operations. By simultaneously adjusting the wheel mountings, the frame 3 may be vertically elevated, thereby to move the kerf cutter through a series of horizontal cutting planes, and by independently adjusting the wheel mountings the frame 3 may be tilted about a transverse axis with respect to the horizontal, thereby to vary the angle in altitude of the kerf cutter. The means for supplying fluid under pressure to the cylinders 127 and 146 will hereinafter be described.

The improved means for driving the front traction wheels 4 for propelling the machine over the mine floor will now be described. As shown in Fig. 4, formed on the forward end of the motor power shaft 9 is a spur pinion 155 meshing with and driving a spur gear 156 keyed to a shaft 157. The shaft 157 is arranged beneath the motor power shaft in parallelism therewith and is suitably journaled in bearings supported within the frame 3. The gear 156 meshes at its opposite sides with (Fig. 14) and drives spur gears 158 and 159 (see Fig. 11), herein arranged coaxially with parallel longitudinally extending shafts 160 and 161, respectively. These shafts are arranged with their axes spaced equi-distantly from the central vertical longitudinal plane of the frame 3 and suitably journaled within the frame 3. The gears 158 and 159 are formed integral with stub shafts 162 and 163 respectively, and are journaled at their front ends in bearings supported by the rear ends of the shafts 160 and 161 and at their rear ends in bearings supported by a transverse partition 164 within the frame 3, in the manner shown in Fig. 11. The shafts 162 and 163 have respectively formed integral therewith and drive spur gears 165 and 166. Arranged coaxially with the gears 158 and 159 and journaled on bearings supported by the shafts 160 and 161 are spur gears 167 and 168. The gears 165 and 166 mesh with gears 169 and 170 respectively, keyed to longitudinal shafts 171 (Figs. 4 and 14). The shafts 171 have keyed thereto and drive gears 173 and 174 meshing respectively with the gears 167 and 168. The gears 158 and 159 constitute high speed terminal gears, while the gears 167 and 168 constitute low speed terminal gears; and these gears are connectible to the shafts 160 and 161 by conventional multiple disc clutches 175 and 176 (Fig. 11). The operating means for these disc clutches comprises shipper yokes 177 and 178 keyed to transverse operating shafts 179 and 180 respectively (Fig. 10); and these operating shafts have suitable operating handles 181 and 182 conveniently located at the side of the machine. It will thus be seen that by proper application of the disc clutches 175 and 176 the shafts 160 and 161 may be driven at either a relatively high speed or a relatively low speed. As shown in Fig. 11, journaled on bearings supported by the shafts 160 and 161 are reverse bevels 183 and 184 selectively connectible by sliding jaw clutches 185 to the shafts. The jaw clutches 185 are provided with suitable operating means including shipper yokes 186 connected through suitable shaft and link connections to operating levers 187 and 188 respectively, located at the side of the machine near the levers 181, 182. These reverse bevels mesh with bevel gears 189 having sleeve-like hubs journaled within bearings supported by bearing supports 190 formed integral with the frame 3. The gears 189 are keyed to coaxial shafts 191 having keyed thereto spur gears 192 meshing with internal gears 193 secured to the wheels 4. By sliding the jaw clutches 185 in one direction or the other, the reverse bevels may be selectively connected to the shafts 160 and 161 so that the shafts 191, together with the wheels 4, may be driven in either of opposite directions. The axes of the shafts 191 are alined with the swivel axes of the axle frames 122 so that the wheels may be driven irrespective of the adjusted position of the axle frames. It is accordingly evident that the wheels 4 may be driven at a relatively high speed suitable for transport or at a relatively low speed suitable for cutting, and in either of opposite directions at either speed.

Figure 15:
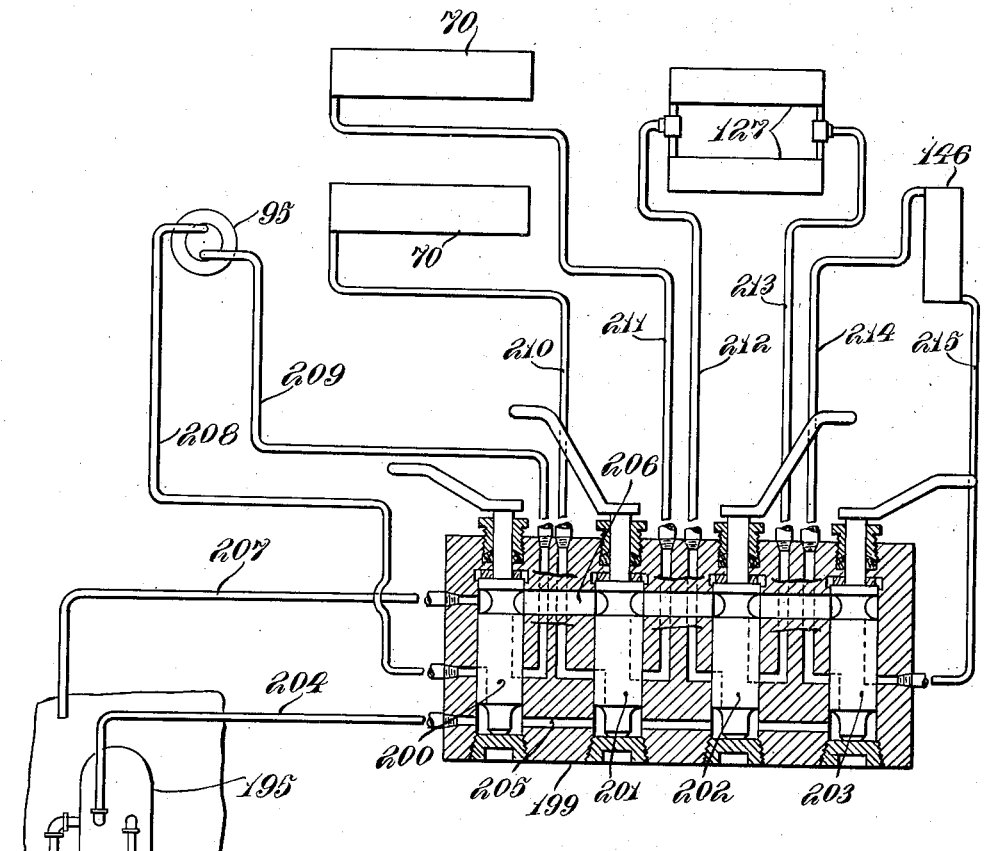
Fig. 15 is a diagrammatic view of the hydraulic fluid system.

Referring to Fig. 4, it will be noted that the frame 3 of the machine has formed therein a chamber 194 containing a liquid, and arranged in this chamber is a fluid pump 195 of a conventional design for pumping liquid under pressure from the liquid chamber to the various hydraulic adjusting cylinders. This pump is driven from the shaft 25 through a spur gear 196 keyed to the shaft and meshing with a spur gear 197 keyed to the pump drive shaft 198. It is accordingly evident that when the motor 8 is running, the pump is driven through the spur gearing 196, 197. As shown in Fig. 15, the hydraulic fluid system associated with the pump includes a valve box 199 supported at one side of the machine frame 3 and having a series of parallel vertical bores respectively receiving control valves 200, 201, 202 and 203, each having a manual control handle. The pump 195 has its discharge side connected by a conduit 204 to the supply passage 205 of the valve box, and the valve box discharge passage 206 is connected by a conduit 207 back to the liquid chamber 194. The valve 200 controls the supply of fluid under pressure to the drum lock cylinder 95 and has its bore connected by conduits 208 and 209 to the opposite ends of the cylinder. The valve 201 controls the supply of fluid under pressure to the cylinders 70 for swinging the kerf cutter and rotating the cutter head, and has its bore connected by conduits 210 and 211 to the forward ends of the cylinders. The valve 202 controls the flow of fluid under pressure to the front elevating and tilting cylinders 127, and has its bore connected by conduits 212 and 213 to the opposite ends of the cylinders. The valve 203 controls the flow of fluid under pressure to the rear elevating and tilting cylinder 146, and has its bore connected by conduits 214 and 215 to the opposite ends of the cylinder. When these valves are in their neutral position, the fluid is trapped within the various cylinders, thereby to lock the devices adjusted thereby in their different adjusted positions. Spring-loaded safety valves set to open at a predetermined pressure may be contained in the valve box for preventing excessive pressures from being built up in the cylinders, as is well known to those skilled in the art.

Figure 18:
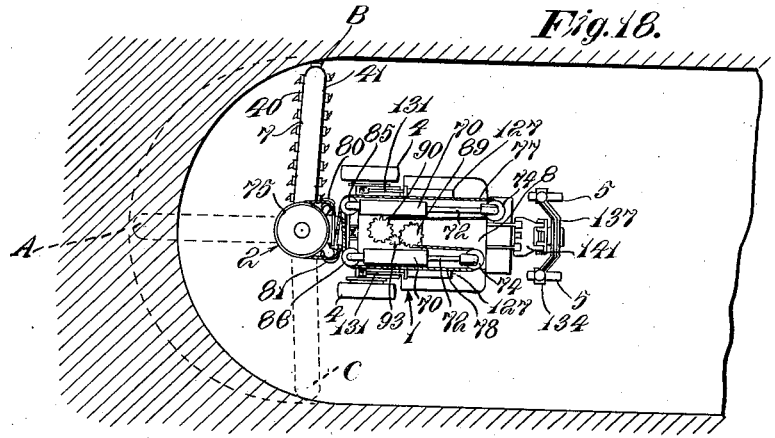
Fig. 18 is a diagrammatic plan view showing a kerf-cutting machine in horizontal cutting position in a mine entry.
Figure 19:
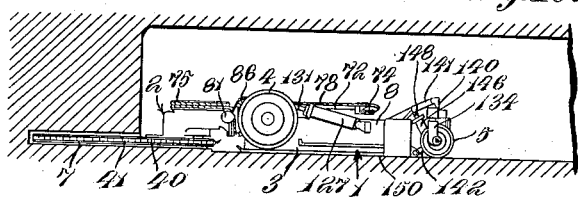
Fig. 19 is a diagrammatic side view showing the machine in a mine entry with the kerf cutter in horizontal bottom-cutting position.

The general mode of operation of the improved kerf-cutting machine is as follows. The machine may be propelled over the mine floor by the traction wheels 4 at a relatively high transport speed under the control of the high speed control clutches 176 of the wheel driving mechanism, and may be propelled in either of opposite directions at said high speed under the control of the reversing clutches 185. When the machine is located in cutting position with respect to the coal face, as shown in Fig. 18, and it is desired to make a horizontal cut in the coal, the lock of the swiveled cutter support 17 may be released, while the cutter head lock remains applied, and fluid under pressure may then be supplied to one of the swinging cylinders 70, thereby to effect swinging of the kerf cutter 7 from its central position, indicated in dotted lines at A in Fig. 18, laterally toward the right-hand rib until the kerf cutter assumes the full-line position indicated at B in that figure, with its tip end at the right-hand rib. The cutter chain clutch 34 may then be connected, thereby to effect rapid circulation of the cutter chain about the margin of the cutter bar of the kerf cutter 7. The operator may then effect operation of the hydraulic cylinders 127 and 146 to effect adjustment of the kerf cutter into a horizontal cutting position at the desired elevation. When the kerf cutter is in a position to make a horizontal cut at the floor level, the cylinders 127 and 146 may be operated to raise the wheels 4 and 5 out of engagement with the mine floor, with the machine bottom 150 resting directly on the mine floor, thereby to provide increased stability during the cutting operation. When the kerf cutter is properly positioned at the right-hand rib and the cutter chain is operating, the cutter support lock may be released while the cutter head lock is held applied, and upon admission of fluid under pressure to the other swinging cylinder 70 the kerf cutter 7 may be swung horizontally about its pivot from the position indicated at B in Fig. 18 to the position indicated in dotted lines at C in that figure, with the tip end of the kerf cutter located at the left-hand rib, thereby to make a horizontal swinging cut across the coal face. By applying the cutter support lock and releasing the cutter head lock and operating one or the other of the cylinders 70, the revoluble cutter head 6 may be rotated about its axis to locate the kerf cutter in its overcutting position above the head axis. In Fig. 19 the machine is shown in a position to make a horizontal swinging cut at the floor level, with the machine frame resting directly on its bottom on the mine floor, the wheels 4 and 5 at that time being elevated out of contact with the floor. Under certain conditions the traction wheels 4 may be employed to effect sumping and withdrawal movements of the kerf cutter during operation of the machine in accordance with the "arcwall" method of cutting, in a well known manner.

Figure 20:
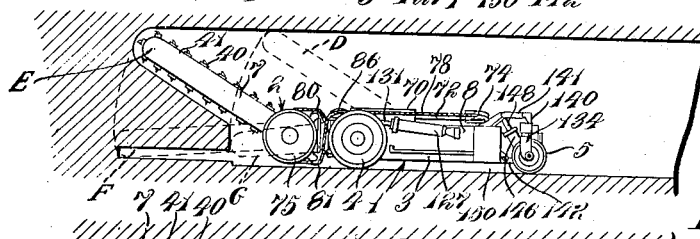
Fig. 20 is a diagrammatic side view showing the machine in a mine entry with the kerf cutter in a shear-cutting position.

When it is desired to cut a vertical shear kerf in the coal face, the cutter support lock may be applied and the cutter head lock released, and the revoluble cutter head 6 may be rotated into a position wherein the kerf cutter may swing about a horizontal pivot in a vertical plane. When the kerf cutter is in its shear cutting position, the cutter head lock may be applied and the cutter support lock released, and when fluid under pressure is supplied to one of the cylinders 70, the kerf cutter may be swung in a vertical direction about its pivot until it assumes the dotted-line position indicated at D in Fig. 20, with its tip end at the roof level. The cutter support lock may then be applied, and upon application of the slow speed clutches 175 of the wheel driving mechanism and the proper connection of the reversing clutches 185, the machine may be propelled by the traction wheels 4 in a forward direction bodily over the mine floor to sump the kerf cutter into the coal. When the sumping cut is completed and the kerf cutter is in the position indicated at E in Fig. 20, the cutter support lock may be released, and upon admission of fluid under pressure to the proper cylinder 70 the kerf cutter may be swung downwardly in its plane, from the position indicated at E to the position indicated at F in Fig. 20, thereby to make a vertical swinging cut. The cutter support lock is then again applied, and when the reversing clutches 185 are shifted to effect reversal of the wheel drive, and the low speed clutches are applied, the machine may be propelled by the traction wheels 4 in a rearward direction bodily over the mine floor to move the kerf cutter from the position indicated at F to the position indicated in dotted lines at G in Fig. 20, thereby to effect the withdrawal cut.

Figure 21:
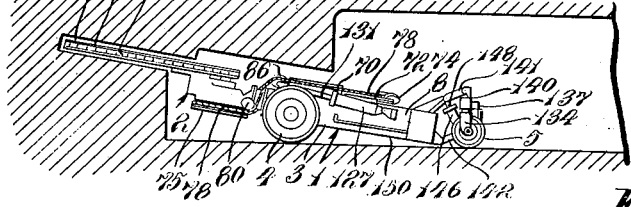
Fig. 21 is a diagrammatic side view showing the machine in a mine entry with the kerf cutter in horizontal over-cutting position.
Figure 22:
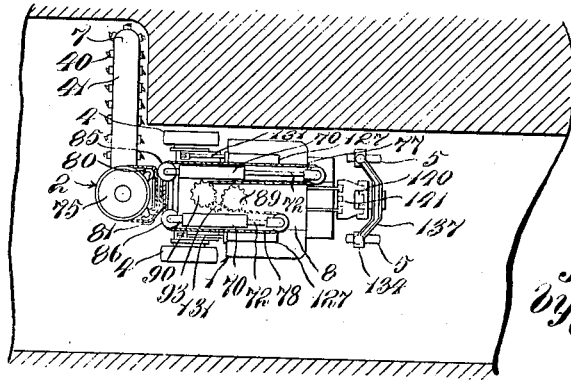
Fig. 22 is a diagrammatic plan view showing the machine operating in accordance with the longwall method of cutting.

When the kerf cutter is in any of its horizontal cutting positions, fluid under pressure may be supplied to the front wheel cylinders 127 independently of the rear wheel cylinder 146, and vice versa, thereby to effect tilting of the kerf cutter either upwardly or downwardly with respect to the horizontal, to enable the kerf cutter to make a series of inclined overcuts in the manner shown in Fig. 21, or a series of inclined bottom cuts. The wheel mountings may also be independently adjusted to enable the machine to follow an uneven floor when the machine is operating in accordance with the longwall method of cutting, as shown in Fig. 22. In Fig. 21 the kerf cutter is shown in its overcutting position, with the kerf cutter above the head axis, while in Fig. 22 the kerf cutter is locked in a right-angle longwall cutting position at one side of the machine frame. During all bodily movements of the machine over the mine floor during the cutting operation, as well as during transport of the machine about the mine, the machine is propelled by the direct contact of the rubber-tired traction wheels with the mine floor; and by independently operating the traction wheels the machine may be steered by the wheels, the rear swiveled caster wheels facilitating the steering of the machine, thereby to enable the machine to negotiate the relatively sharply curved passages in the coal mine. The machine may be operated to cut from left to right simply by reversing the cutters on the cutter chain and reversing the driving motor of the machine.

As a result of this invention it will be noted that by the provision of the pneumatic rubber-tired supporting wheels for the machine the machine may be supported directly on the mine floor and propelled by the traction of the wheels in direct contact with the mine floor, thereby eliminating the necessity of a mine trackway. It will also be evident that by the provision of the improved adjustable wheel mounting structure the machine may be operated to cut horizontal kerfs at different elevations and may be tilted to cut kerfs inclined with respect to the horizontal; and that during bottom cutting the wheels may be elevated completely out of contact with the mine floor so that the machine frame rests directly on its bottom on the mine floor to obtain increased stability during the horizontal cutting operation. It will further be evident that by the provision of the caster wheel arrangement at the rear end of the machine and the independent drives for the front traction wheels, the machine may be easily steered, thereby to facilitate movement of the machine through the relatively restricted and sharply curved passages of the coal mine. Other modes of use and advantages of the invention will be clearly apparent to those skilled in the art.

While there is in this application specifically described one form which the invention may assume in practice, it will be understood that this form is shown for purposes of illustration and that the invention may be modified and embodied in various other forms without departing from its spirit or the scope of the appended claims.

What I claim as new and desire to secure by Letters Patent is:

1. In a kerf-cutting machine, a machine frame, kerf-cutting mechanism carried thereby, and means for supporting and propelling the machine comprising a pair of front traction wheels at the front end of said machine frame, a pair of rear guiding wheels at the rear end of said frame, all of said wheels directly engaging the mine floor, adjustable mountings for said wheels, and mechanism connected between said wheel mountings and said frame for adjusting said frame to vary the elevation thereof, said adjustable mounting for said rear guiding wheels including parallel arms and means for swinging said arms.

2. In a kerf-cutting machine, a machine frame, kerf-cutting mechanism carried thereby, and means for supporting and propelling the machine comprising a pair of front traction wheels at the front end of said machine frame, a pair of rear guiding wheels at the rear end of said frame, all of said wheels directly engaging the mine floor, adjustable mountings for said wheels, and mechanism connected between said wheel mountings and said frame for adjusting said frame to vary the elevation thereof, said adjustable mounting for said rear guiding wheels including parallel arms and means for swinging said arms, and said adjustable mountings for said front wheels including rotatable axle frames having eccentric wheel axles and means for rotating said axle frames.

3. In a kerf-cutting machine, a machine frame, kerf-cutting mechanism carried thereby, and means for supporting and propelling the machine during the cutting operation and transport of the machine about the mine comprising a pair of front traction wheels, a pair of rear guiding wheels, all of said wheels directly engaging the mine floor, an adjustable mounting for said front traction wheels, and an adjustable mounting for said rear guiding wheels, said rear wheel mounting comprising a transverse equalizer bar pivoted on a horizontal axis extending longitudinally of the machine, and guiding wheel frames, one for each guiding wheel, swiveled on the opposite ends of said equalizer bar.

4. In a kerf-cutting machine, a machine frame, kerf-cutting mechanism carried thereby, and means for supporting and propelling the machine during the cutting operation and transport of the machine about the mine comprising a pair of front traction wheels, a pair of rear guiding wheels, all of said wheels directly engaging the mine floor, adjustable mountings for said front traction wheels, means for adjusting said mountings for elevating the forward end of said frame, an adjustable mounting for said rear guiding wheels, and means for adjusting said rear wheel mounting for elevating the rear end of said frame, said rear wheel mounting comprising a transverse equalizer bar pivoted on a horizontal axis extending longitudinally of the machine, and guiding wheel frames, one for each guiding wheel, swiveled on the opposite ends of said equalizer bar.

5. In a kerf-cutting machine, a machine frame, kerf-cutting mechanism carried thereby, and means for supporting and propelling the machine during the cutting operation and transport of the machine about the mine comprising a pair of front traction wheels, a pair of rear guiding wheels, all of said wheels directly engaging the mine floor, and adjustable mountings for said wheels, the mountings for said front wheels comprising swiveled eccentrics mounted to turn in circular bearings and having axles for said front wheels, said axles arranged in offset parallel relation to the swivel axes of said eccentrics, and means for rotating said eccentrics and for holding said eccentrics in adjusted position.

6. In a kerf-cutting machine, a machine frame, kerf-cutting mechanism carried thereby, and means for supporting and propelling the machine during the cutting operation and transport of the machine about the mine comprising a pair of front traction wheels, a pair of rear guiding wheels, all of said wheels directly engaging the mine floor, and adjustable mountings for said wheels, the mountings for said front wheels comprising swiveled axle frames having eccentric axles for said front wheels and means for rotating said axle frames and for holding said axle frames in adjusted position, and said mounting for said rear wheels comprising parallel arms and means for swinging said arms about their pivots and for holding said arms in adjusted position.

7. In a kerf-cutting machine, a machine frame, kerf-cutting mechanism carried thereby, and means for supporting and propelling the machine during the cutting operation and transport of the machine about the mine comprising a pair of front traction wheels, a pair of rear guiding wheels, all of said wheels directly engaging the mine floor, and adjustable mountings for said wheels, said mounting for said rear wheels comprising a connecting frame, wheel frames connected to said connecting frame, and parallel arms for pivotally connecting said connecting frame to the rear end of said machine frame.

8. In a kerf-cutting machine, a machine frame, kerf-cutting mechanism carried thereby, and means for supporting and propelling the machine during the cutting operation and transport of the machine about the mine comprising a pair of front traction wheels, a pair of rear guiding wheels, all of said wheels directly engaging the mine floor, and adjustable mountings for said wheels, said mounting for said rear wheels comprising a connecting frame, wheel frame connected to said connecting frame, parallel arms for pivotally connecting said connecting frame to the read end of said machine frame, and adjustable means for swinging said parallel arms about their pivots for varying the elevation of the rear end of said machine frame.

9. In a kerf-cutting machine, a machine frame, kerf-cutting mechanism carried thereby, and means for supporting and propelling the machine during the cutting operation and transport of the machine about the mine comprising a pair of front traction wheels, a pair of rear guiding wheels, all of said wheels directly engaging the mine floor, and adjustable mountings for said wheels, said mounting for said rear wheels comprising a connecting frame, wheel frames connected to said connecting frame, parallel arms for pivotally connecting said connecting frame to the rear end of said machine frame and adjustable means for swinging said parallel arms about their pivots for varying the elevation of the rear end of said machine frame, and means for adjusting said mountings for said front wheels for varying the elevation of the forward end of said machine frame.

10. In a kerf cutting machine, the combination comprising a kerf cutting mechanism adapted to cut a plane kerf in a coal seam, and means for supporting and propelling said kerf cutting mechanism comprising a pair of front traction wheels and a pair of rear guiding wheels, said wheels being provided with mountings and all of said wheels directly engaging the mine floor, and adjustable connections between said wheels and said kerf cutting mechanism for adjusting the latter to vary the elevation thereof, thereby to position said kerf cutter to cut parallel plane kerfs in the coal seam, said adjustable connections for said rear wheels embodying a parallel motion arm structure pivotally mounted to swing in a vertical direction and operatively connected to the rear wheel mountings, and motor operated means for vertically swinging said arm structure while said rear wheels remain in contact with the mine floor and for holding said arm structure in adjusted position.

11. In a kerf-cutting machine, a machine frame, kerf-cutting mechanism carried thereby, and means for supporting and propelling the machine during the cutting operation and transport of the machine about the mine comprising a pair of front traction wheels, a pair of rear guiding wheels, all of said wheels directly engaging the mine floor, and adjustable mountings for said wheels, the adjustable mountings for said rear wheels embodying an arm structure pivotally mounted to swing in a vertical direction and operatively connected to the rear wheel mountings and motor operated means being provided for vertically swinging said arm structure while said rear wheels remain in contact with the mine floor and for holding said arm structure in adjusted position, the mountings for said front wheels comprising swiveled eccentrics mounted to turn in circular bearings and having axles for said front wheels, said axles arranged in offset parallel relation to the swivel axes of said eccentrics, and motor operated means for rotating said eccentrics and for holding said eccentrics in adjusted position.

12. In a kerf cutting machine, the combination comprising a kerf cutting mechanism adapted to cut a plane kerf in the coal seam, and means for supporting and propelling the machine comprising a pair of front traction wheels, a pair of rear guiding wheels having mounting means swivelled to turn on vertical axes, all of said wheels directly engaging the mine floor, and adjustable connections between said wheels and said kerf cutting mechanism for adjusting the latter to vary the elevation thereof, thereby to cut parallel plane kerfs in the coal seam, said adjustable connections for said rear wheels embodying a parallel motion arm structure pivotally mounted to swing in a vertical direction and operatively connected to said rear wheel mounting means, and motor operated means for vertically swinging said arm structure while said rear wheels remain in contact with the mine floor and for holding said arm structure in its adjusted position.

13. In a kerf-cutting machine, a machine frame, kerf-cutting mechanism carried thereby, and means for supporting and propelling the machine during the cutting operation and transport of the machine about the mine comprising a pair of front traction wheels, a pair of rear guiding wheels, all of said wheels directly engaging the mine floor, and adjustable mountings for said wheels adjustable to position said kerf-cutting mechanism for the cutting of parallel kerfs at different elevations in the coal seam, the mountings for said rear guiding wheels swivelled to turn on vertical axes and the mountings for said front wheels comprising swiveled eccentrics mounted to turn in circular bearings and having axles for said front wheels, said axles arranged in offset parallel relation to the swivel axes of said eccentrics, and motor operated means for rotating said eccentrics and for holding said eccentrics in adjusted position.

14. In a kerf cutting machine, the combination comprising a kerf cutting mechanism adapted to cut a plane kerf in a coal seam, and means for supporting and propelling said kerf cutting mechanism comprising a pair of front traction wheels and a pair of rear guiding wheels, said wheels being provided with mountings and all of said wheels directly engaging the mine floor, and adjustable connections between said wheels and said kerf cutting mechanism for adjusting the latter to vary the elevation thereof, thereby to cut parallel plane kerfs in the coal seam, said adjustable connections for said rear wheels embodying parallel arms pivotally mounted to swing in a vertical direction and operatively connected to the rear wheel mountings and an extensible power device connected between the outer end of one of said arms and the inner end of the other arm for vertically swinging said arms while said rear wheels remain in contact with the mine floor and for holding said arms in adjusted position.

15. In a kerf cutting machine, the combination comprising a kerf cutting mechanism adapted to cut a plane kerf in a coal seam, and means for supporting and propelling said kerf cutting mechanism comprising a pair of front traction wheels and a pair of rear guiding wheels, said wheels being provided with mountings and all of said wheels directly engaging the mine floor, and adjustable connections between said wheels and said kerf cutting mechanism for adjusting the latter to vary the elevation thereof, thereby to cut parallel plane kerfs in the coal seam, said adjustable connections for said rear wheels embodying a parallel motion arm structure pivotally mounted to swing in a vertical direction and operative connections between said arm structure and the rear wheel mountings including mounting means swivelled to turn about a horizontal longitudinal axis and means for vertically swinging said arm structure while said rear wheels remain in contact with the mine floor and for holding said arm structure in its adjusted position, said arm structure always maintaining said swivel axis parallel to a common straight line during swinging of said arm structure.

16. In a kerf cutting machine, the combination comprising a kerf cutting mechanism adapted to cut a plane kerf in a coal seam, and means for supporting and propelling said kerf cutting mechanism comprising a pair of front traction wheels and a pair of rear guiding wheels, said wheels being provided with mountings and all of said wheels directly engaging the mine floor, and adjustable connections between said wheels and said kerf cutting mechanism for adjusting the latter to vary the elevation thereof, thereby to cut parallel plane kerfs in the coal seam, said adjustable connections for said rear wheels embodying a parallel motion arm structure comprising parallel upper and lower arms pivotally mounted to swing in a vertical direction and operatively connected to the rear wheel mountings and an extensible power device pivotally mounted to swing in a vertical direction and extending between the outer end of the lower arm and the inner end of the upper arm, said power device also serving to hold said arms in adjusted position.

17. In a kerf-cutting machine, a machine frame, kerf-cutting mechanism carried thereby, and means for supporting and propelling the machine during the cutting operation and transport of the machine about the mine comprising a pair of front traction wheels, a pair of rear guiding wheels, all of said wheels directly engaging the mine floor, and adjustable mountings for said wheels adjustable to position said kerf-cutting mechanism for the cutting of parallel kerfs at different elevations in the coal seam, the mountings for said front wheels comprising swiveled eccentrics mounted to turn in circular bearings and having axles for said front wheels, said axles arranged in offset parallel relation to the swivel axes of said eccentrics, and means for rotating said eccentrics and for holding said eccentrics in adjusted position, said last mentioned means including extensible power devices pivotally mounted to swing in a vertical direction and respectively pivotally connected to said eccentrics for rotating the latter and for holding the same in adjusted position.

18. In a kerf-cutting machine, a machine frame, kerf-cutting mechanism carried thereby, and means for supporting and propelling the machine during the cutting operation and transport of the machine about the mine comprising a pair of front traction wheels, a pair of rear guiding wheels, all of said wheels directly engaging the mine floor, and adjustable mountings for said wheels adjustable to position said kerf-cutting mechanism for the cutting of parallel kerfs at different elevations in the coal seam, the mountings for said front wheels comprising swiveled eccentrics mounted to turn in circular bearings and having axles for said front wheels, said axles arranged in offset parallel relation to the swivel axes of said eccentrics, and means for rotating said eccentrics and for holding said eccentrics in adjusted position, said last mentioned means including extensible power devices pivotally mounted to swing in a vertical direction and respectively pivotally connected to said eccentrics for rotating the latter and for holding the same in adjusted position and said power devices having controlling means for independently controlling the flow of power to said power devices whereby said eccentrics may be independently rotated thereby to adjust independently the adjustable connections for said front wheels.

JOSEPH F. JOY.